United States Patent
Chaturvedi et al.

(10) Patent No.: US 12,045,259 B2
(45) Date of Patent: Jul. 23, 2024

(54) CLUSTERING OF DATA OBJECTS BASED ON DATA OBJECT ATTRIBUTES

(71) Applicant: SAP SE, Walldorf (DE)

(72) Inventors: Abhishek Chaturvedi, Bangalore (IN); Jehil Vora, Bangalore (IN); Surendranath Gopinathan, Bangalore (IN); Nithya Rajagopalan, Bangalore (IN); Sunil Gornalle, Bidar (IN); Jeremiah Reeves, Ripon, CA (US); Erik Scheithauer, Vienna (AT); Girija B, Bangalore (IN); Samhith Bharadwaj, Bangalore (IN)

(73) Assignee: SAP SE, Walldorf (DE)

( * ) Notice: Subject to any disclaimer, the term of this patent is extended or adjusted under 35 U.S.C. 154(b) by 161 days.

(21) Appl. No.: 17/347,336

(22) Filed: Jun. 14, 2021

(65) Prior Publication Data
US 2022/0398263 A1 Dec. 15, 2022

(51) Int. Cl.
*G06F 16/00* (2019.01)
*G06F 7/08* (2006.01)
*G06F 16/28* (2019.01)

(52) U.S. Cl.
CPC .............. *G06F 16/285* (2019.01); *G06F 7/08* (2013.01)

(58) Field of Classification Search
CPC .................................................. G06F 16/285
USPC ......................................................... 707/738
See application file for complete search history.

(56) References Cited

U.S. PATENT DOCUMENTS

| | | | |
|---|---|---|---|
| 2014/0280146 A1* | 9/2014 | Wood .................... | G06F 16/285 707/737 |
| 2016/0275168 A1* | 9/2016 | Nemery ................ | G06F 16/285 707/707 |
| 2016/0283533 A1* | 9/2016 | Urmanov .............. | G06F 16/285 707/707 |
| 2020/0175321 A1* | 6/2020 | Panging ................. | G06F 18/22 707/707 |
| 2020/0394453 A1* | 12/2020 | Ma .......................... | G06T 7/12 707/707 |

(Continued)

OTHER PUBLICATIONS

Thangavel et al. "A New ClusteringTechnique Using Standard Deviation", National Seminar on Recent Developments in Concrete Mathematics, Mar. 2002, 8 pages.

(Continued)

*Primary Examiner* — Alexandria Y Bromell
(74) *Attorney, Agent, or Firm* — Fountainhead Law Group, PC

(57) ABSTRACT

Some embodiments provide a program that determines a plurality of data objects. Each data object in the plurality of data objects includes a first attribute and a second attribute. The program further sorts values of the first attribute of the plurality of data objects. The program also sorts values of the second attribute of the plurality of data objects. The program further determines a first distance value based on the sorted values of the first attribute of the plurality of data objects. The program also determines a second distance value based on the sorted values of the second attribute of the plurality of data objects. The program further defines a plurality of clusters based on the sorted values of the first attribute of the plurality of data objects, the first distance value, the sorted values of the second attribute of the plurality of data objects, and the second distance value.

20 Claims, 12 Drawing Sheets

(56) References Cited

U.S. PATENT DOCUMENTS

2020/0409988 A1\* 12/2020 Singh .................... G06F 16/583
                                                          707/707

OTHER PUBLICATIONS

Fences "Outlier", Online-Wikipedia.org/wiki/Outlier, 9 pages.

\* cited by examiner

400

Attribute X

[2.0, 3.0, 6.0, 8.0, 12.0, 14.0, 17.0, 18.0, 23.0, 24.0, 26.0, 27.0, 33.0, 36.0, 37.0, 38.0]

500

Attribute Y

[2.0, 5.0, 6.0, 8.0, 12.0, 14.0, 15.0, 18.0, 23.0, 24.0, 25.0, 28.0, 32.0, 34.0, 35.0, 37.0]

Attribute Y

Attribute Y

Range 1 = 2.0 - 2.0
Range 2 = 5.0 - 8.0
Range 3 = 12.0 - 15.0
Range 4 = 18.0 - 18.0
Range 5 = 23.0 - 25.0
Range 6 = 28.0 - 28.0
Range 7 = 32.0 - 37.0

Attribute X

Attribute X

Range 1 = 2.0 - 8.0
Range 2 = 12.0 - 18.0
Range 3 = 23.0 - 27.0
Range 4 = 33.0 - 38.0

| Attribute | Start of Range | End of Range |
|---|---|---|
| X | 23 | 27 |
| Y | 2 | 2 |

1028

| Attribute | Start of Range | End of Range |
|---|---|---|
| X | 23 | 27 |
| Y | 5 | 8 |

1030

| Attribute | Start of Range | End of Range |
|---|---|---|
| X | 23 | 27 |
| Y | 12 | 15 |

1032

| Attribute | Start of Range | End of Range |
|---|---|---|
| X | 23 | 27 |
| Y | 18 | 18 |

1034

| Attribute | Start of Range | End of Range |
|---|---|---|
| X | 23 | 27 |
| Y | 23 | 25 |

1036

| Attribute | Start of Range | End of Range |
|---|---|---|
| X | 23 | 27 |
| Y | 28 | 28 |

1038

| Attribute | Start of Range | End of Range |
|---|---|---|
| X | 23 | 27 |
| Y | 32 | 37 |

1040

| Attribute | Start of Range | End of Range |
|---|---|---|
| X | 33 | 38 |
| Y | 2 | 2 |

1042

| Attribute | Start of Range | End of Range |
|---|---|---|
| X | 33 | 38 |
| Y | 5 | 8 |

1044

| Attribute | Start of Range | End of Range |
|---|---|---|
| X | 33 | 38 |
| Y | 12 | 15 |

1046

| Attribute | Start of Range | End of Range |
|---|---|---|
| X | 33 | 38 |
| Y | 18 | 18 |

1048

| Attribute | Start of Range | End of Range |
|---|---|---|
| X | 33 | 38 |
| Y | 23 | 25 |

1050

| Attribute | Start of Range | End of Range |
|---|---|---|
| X | 33 | 38 |
| Y | 28 | 28 |

1052

| Attribute | Start of Range | End of Range |
|---|---|---|
| X | 33 | 38 |
| Y | 32 | 37 |

| Attribute | Cluster 1 | Cluster 2 | Cluster 3 | Cluster 4 | Cluster 5 | Cluster 6 | Cluster 7 | Cluster 8 | Cluster 9 | | Cluster 28 |
|---|---|---|---|---|---|---|---|---|---|---|---|
| X | 2 - 8 | 2 - 8 | 2 - 8 | 2 - 8 | 2 - 8 | 2 - 8 | 2 - 8 | 12 - 18 | 12 - 18 | ... | 33 - 38 |
| Y | 2 - 2 | 5 - 8 | 12 - 15 | 18 - 18 | 23 - 25 | 28 - 28 | 32 - 37 | 2 - 2 | 5 - 8 | | 32 - 37 |

Cluster Information

CLUSTERING OF DATA OBJECTS BASED ON DATA OBJECT ATTRIBUTES

BACKGROUND

In the context of data analysis, clustering refers to the techniques used to group objects in such a way that objects in the same group (e.g., a cluster) are more similar to each other than to those in other groups (e.g., other clusters). Clustering is applicable to many technical areas. Examples of technical areas include image processing, data compression, computer graphics, machine learning, artificial intelligence, bioinformatics, etc. There are many different types of techniques that may be used to cluster objects together. For instance, some approaches utilize a centroid-based method (e.g., a k-means clustering method) where different centroids are defined for different clusters. The centroids are used to assign objects to clusters. Another type of technique is a density-based clustering method (e.g., a density-based spatial clustering of applications with noise (DBSCAN) method). These types of clustering methods define clusters based on areas with higher density of data objects relative to other areas of data objects. Yet another type of clustering technique is hierarchical clustering (e.g., a single-linkage clustering method, a complete linkage clustering method, etc.). With these types of clustering methods, distance between data objects. Many other types of clustering techniques exist.

SUMMARY

In some embodiments, a non-transitory machine-readable medium stores a program executable by at least one processing unit of a device. The program determines a plurality of data objects. Each data object in the plurality of data objects includes a first attribute and a second attribute. The program further sorts values of the first attribute of the plurality of data objects. The program also sorts values of the second attribute of the plurality of data objects. The program further determines a first distance value based on the sorted values of the first attribute of the plurality of data objects. The program also determines a second distance value based on the sorted values of the second attribute of the plurality of data objects. The program further defines a plurality of clusters based on the sorted values of the first attribute of the plurality of data objects, the first distance value, the sorted values of the second attribute of the plurality of data objects, and the second distance value.

In some embodiments, defining the plurality of clusters may include defining a first set of ranges of values based on the first plurality of values and the first distance value; defining a second set of ranges of values based on the second plurality of values and the second distance value; and determining a set of permutations of a range of values in the first set of ranges of values and a range of values in the second set of ranges of values. Each cluster in the plurality of clusters may be defined based on a permutation in the set of permutations of a range of values in the first set of ranges of values and a range of values in the second set of ranges of values. The program may further assign data objects in the plurality of clusters based on the values of the first and second attributes of the data objects.

In some embodiments, the program may further remove outliers from the sorted values of the first attribute of the plurality of data objects; and remove outliers from the sorted values of the second attribute of the plurality of data objects. The program may further receive, from each source in a plurality of sources, a set of answers to a set of questions in a questionnaire regarding a data object; and determine the values of the first attribute and the second attribute of the plurality of data objects based on the set of answers received from the plurality of sources. Determining the values of the first attribute and the second attribute of the plurality of data objects may include translating the set of answers from each source in the plurality of sources to a set of numerical values. The program may further provide, for each cluster in the plurality of clusters, the range of values of the first attribute used to define the cluster and the range of values of the second attribute used to define the cluster.

In some embodiments, a method determines a plurality of data objects. Each data object in the plurality of data objects includes a first attribute and a second attribute. The method further sorts values of the first attribute of the plurality of data objects. The method also sorts values of the second attribute of the plurality of data objects. The method further determines a first distance value based on the sorted values of the first attribute of the plurality of data objects. The method also determines a second distance value based on the sorted values of the second attribute of the plurality of data objects. The method further defines a plurality of clusters based on the sorted values of the first attribute of the plurality of data objects, the first distance value, the sorted values of the second attribute of the plurality of data objects, and the second distance value.

In some embodiments, defining the plurality of clusters may include defining a first set of ranges of values based on the first plurality of values and the first distance value; defining a second set of ranges of values based on the second plurality of values and the second distance value; and determining a set of permutations of a range of values in the first set of ranges of values and a range of values in the second set of ranges of values. Each cluster in the plurality of clusters may be defined based on a permutation in the set of permutations of a range of values in the first set of ranges of values and a range of values in the second set of ranges of values. The method may further assign data objects in the plurality of clusters based on the values of the first and second attributes of the data objects.

In some embodiments, the method may further remove outliers from the sorted values of the first attribute of the plurality of data objects; and remove outliers from the sorted values of the second attribute of the plurality of data objects. The method may further receive, from each source in a plurality of sources, a set of answers to a set of questions in a questionnaire regarding a data object; and determine the values of the first attribute and the second attribute of the plurality of data objects based on the set of answers received from the plurality of sources. Determining the values of the first attribute and the second attribute of the plurality of data objects may include translating the set of answers from each source in the plurality of sources to a set of numerical values. The method may further present, for each cluster in the plurality of clusters, the range of values of the first attribute used to define the cluster and the range of values of the second attribute used to define the cluster.

In some embodiments, a system includes a set of processing units and a non-transitory machine-readable medium that stores instructions. The instructions cause at least one processing unit to determine a plurality of data objects. Each data object in the plurality of data objects includes a first attribute and a second attribute. The instructions further cause the at least one processing unit to sort values of the first attribute of the plurality of data objects. The instructions also cause the at least one processing unit to sort values of the second attribute of the plurality of data objects. The instructions further cause the at least one processing unit to determine a first distance value based on the sorted values of the first attribute of the plurality of data objects. The instructions also cause the at least one processing unit to determine a second distance value based on the sorted values of the second attribute of the plurality of data objects. The instructions further cause the at least one processing unit to define a plurality of clusters based on the sorted values of the first attribute of the plurality of data objects, the first distance value, the sorted values of the second attribute of the plurality of data objects, and the second distance value.

In some embodiments, defining the plurality of clusters may include defining a first set of ranges of values based on the first plurality of values and the first distance value; defining a second set of ranges of values based on the second plurality of values and the second distance value; and determining a set of permutations of a range of values in the first set of ranges of values and a range of values in the second set of ranges of values. Each cluster in the plurality of clusters may be defined based on a permutation in the set of permutations of a range of values in the first set of ranges of values and a range of values in the second set of ranges of values.

In some embodiments, the instructions may further cause the at least one processing unit to assign data objects in the plurality of clusters based on the values of the first and second attributes of the data objects. The instructions may further cause the at least one processing unit to remove outliers from the sorted values of the first attribute of the plurality of data objects; and remove outliers from the sorted values of the second attribute of the plurality of data objects. The instructions may further cause the at least one processing unit to receive, from each source in a plurality of sources, a set of answers to a set of questions in a questionnaire regarding a data object; and determine the values of the first attribute and the second attribute of the plurality of data objects based on the set of answers received from the plurality of sources. Determining the values of the first attribute and the second attribute of the plurality of data objects may include translating the set of answers from each source in the plurality of sources to a set of numerical values.

The following detailed description and accompanying drawings provide a better understanding of the nature and advantages of various embodiments of the present disclosure.

BRIEF DESCRIPTION OF THE DRAWINGS

FIG. 6 illustrates the distance set of the sorted attribute values illustrated in FIG. 4 according to some embodiments.

FIG. 7 illustrates the distance set of the sorted attribute values illustrated in FIG. 5 according to some embodiments.

FIG. 8 illustrates ranges of values defined based on the attribute values illustrated in FIG. 4 according to some embodiments.

FIG. 9 illustrates ranges of values defined based on the attribute values illustrated in FIG. 5 according to some embodiments.

FIGS. 10A and 10B illustrate clusters defined based on the ranges of values illustrated in FIGS. 8 and 9 according to some embodiments.

FIG. 12 illustrates a graphical user interface (GUI) that includes the cluster definitions illustrated in FIGS. 10A and 10B according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for clustering data objects based on data object attributes. In some embodiments, a computing system may receive data objects that each has the same attributes. The data objects can have different attribute values for a given attribute. The computing system may employ a clustering technique that uses the attribute values of the attributes of the data objects to define a set of clusters. The clustering technique involves, for each attribute of the data objects, sorting the attribute values of the attribute and then calculating a distance set based on the sorted attribute values. The computing system uses the distance sets to calculate a distance value for each attribute of the data objects. Next, the computing system defines ranges of values for each attribute of the data objects based on the corresponding distance value of the attribute. Finally, the computing system uses the ranges of values to define clusters.

The techniques described in the present application provide a number of benefits and advantages over conventional methods for clustering data objects. For example, using an unsupervised clustering method is more efficient (e.g., uses less processing, uses less memory, etc.) than conventional methods because the algorithm can be executed one time to define optimal clusters. Conventional clustering algorithms may be executed multiple times in order to optimize cluster definitions.

Figure 1:
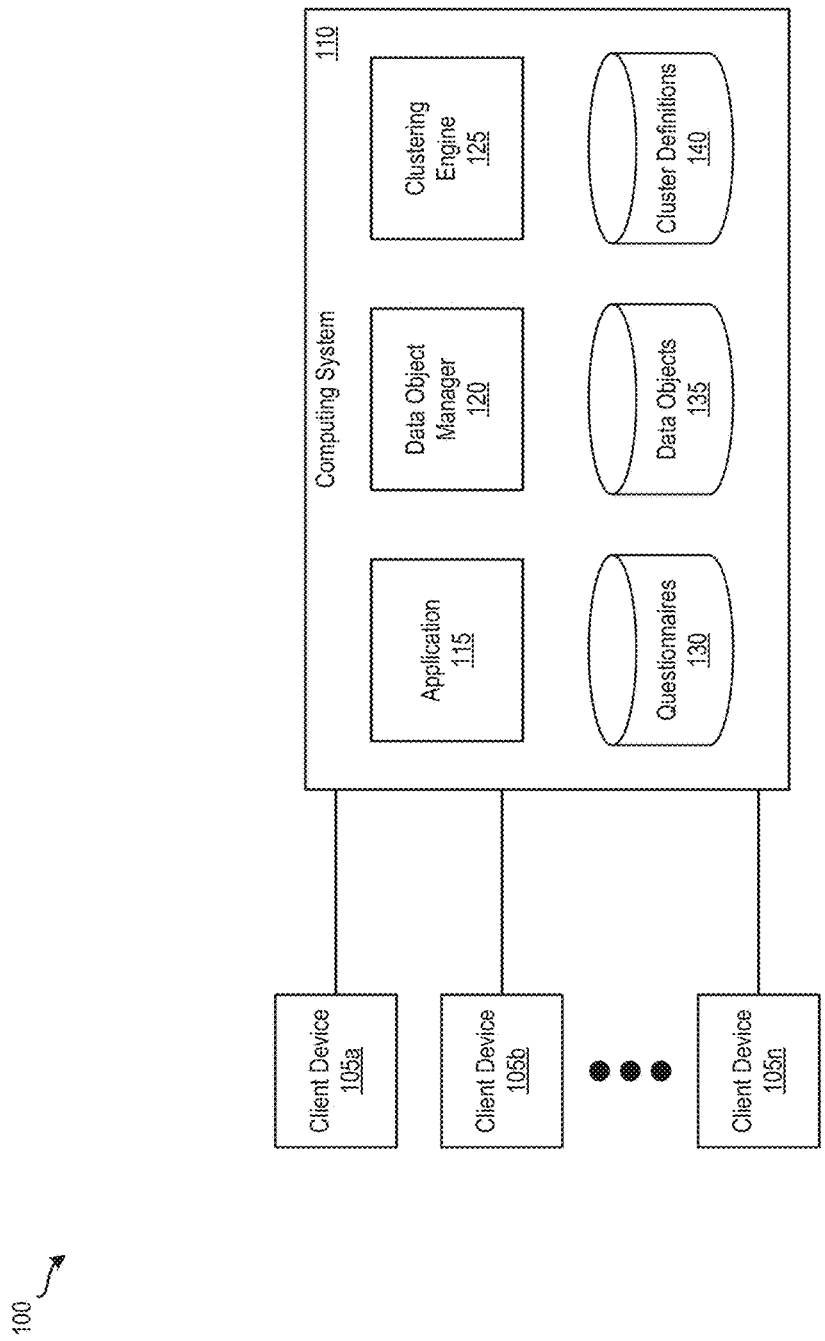
FIG. 1 illustrates a system for clustering data objects according to some embodiments.

FIG. 1 illustrates a system 100 for clustering data objects according to some embodiments. As shown, system 100 includes client devices 105*a-n* and computing system 110. Client devices 105*a-n* are each configured to communicate and interact with computing system 110. For instance, a user of a client device 105 may send application 115 a data object and values for attributes of the data object. In some instances, the user of the client device 105 sends the data object and the values for the attributes in response to receiving from application 115 a request for a type of data object and a questionnaire including questions asking for values for attributes of the type of data object. That is, the values for the attributes that the user of client device 105 provides application 115 are in the form of answers to the questions in the questionnaire. As another example, a user of a client device 105 can send application 115 a request for cluster definitions for a type of data object. In response, the client device 105 may receive a graphical user interface (GUI) that includes the requested cluster definitions. In some cases, a user of a client device 105 can create a questionnaire for a type of data object that includes a set of questions asking for values for attributes of the type of data object. The user of the client device 105 sends the questionnaire to application 115. In other cases, a user of client device 105 may send application 115 a request to send a set of users a request for a type of data objects. Sometimes, a user of client device 105 sends application 115 a request to define clusters for a particular type of data object.

As illustrated in FIG. 1, computing system 110 includes application 115, data object manager 120, clustering engine 125, and storages 130-140. Questionnaires storage 130 is configured to store questionnaires associated with different types of data objects. In some embodiments, a questionnaire associated with a type of data object includes a set of questions asking for values for attributes of the type of data object. Data objects storage 135 stores different types of data objects. In some embodiments, a data object has a type and includes a set of attributes. Cluster definitions storage 140 is configured to store cluster definitions for different types of data objects. In some embodiments, storages 130-140 are implemented in a single physical storage while, in other embodiments, storages 130-140 may be implemented across several physical storages. While FIG. 1 shows storages 130-140 as part of computing system 110, one of ordinary skill in the art will appreciate that questionnaires storage 130, data objects storage 135, and/or cluster definitions storage 140 may be external to computing system 110 in some embodiments.

Application 115 is a software application operating on computing system 110 configured to provide data object management services for client devices 105a-n. For example, application 115 can receive from a client device 105 a data object and values for attributes of the data object. In response to receiving this data, application 115 sends them to data object manager 120 for processing. As another example, application 115 may receive from a client device 105 a questionnaire for a type of data object. In response, application 115 stores the questionnaire in questionnaires storage 130. For some cases where application 115 receives from a client device 105 a request to send a set of users a request for a type of data objects, application 115 accesses questionnaires storage 130 to determine a questionnaire for the type of data object. Then, application 115 sends the set of users (e.g., via client devices 105 that the set of users are using) the request for the type of data object as well as the questionnaire for the type of data object. Application 115 can receive from a client device 105 a request to define clusters for a particular type of data object, which application 115 forwards to clustering engine 125. In some instances, application 115 can receive from a client device 105 a request for cluster definitions for a type of data object. In response to the request, application 115 accesses cluster definitions storage 140, retrieves the requested cluster definitions, and sends the cluster definitions to the client device 105. In some embodiments, application 115 sends the cluster definitions to the client device 105 by providing the client device 105 a GUI that includes the cluster definitions.

Data object manager 120 handles the management of data objects. For instance, data object manager 120 can receive from application 115 a data object and values for attributes of the data object. In response to receiving these data, data object manager 120 stores the data object and the values for its attributes in data objects storage 135. As another example, data object manager 120 may receive from clustering engine 125 a request for a particular type of data objects. In response to the request, data object manager 120 accesses data objects storage, retrieves data objects having the particular type, and sends them to clustering engine 125.

Clustering engine 125 is configured to define clusters for different types of data objects. In some embodiments, clustering engine 125 defines clusters for all the different types of data objects stored in data objects storage 135 at defined intervals (e.g., once every five hours, once a day, once a week, etc.). Clustering engine 125 can receive from application 115 a request to define clusters for a particular type of data object. To define clusters for a type of data object, clustering engine 125 sends data object manager 120 a request for data objects having the type. Once clustering engine 125 receives the requested data objects from data object manager 120, clustering engine 125 sorts the attribute values of each of the attributes of the data objects and then determines a distance set for each attribute of the data objects. Next, clustering engine 125 removes any outliers from each distance set. In some embodiments, clustering engine 125 determines outliers in a distance set using a Tukey's fences technique. For each attribute of the data objects, clustering engine 125 calculates a distance value based on the distance set associated with the attribute. In some embodiments, clustering engine 125 calculates such a distance value by calculating a mean value of the values in the distance set, calculating a standard deviation value based on the values in the distance set, and then adding the mean value and the standard deviation value to form the distance value. Next, clustering engine 125 uses the distance value for the attribute of the data objects to determine ranges of values. Clustering engine 125 determines ranges of values for each of the other attributes the data objects. Finally, clustering engine 125 defines clusters for the type of data objects based on the ranges of values determined for each of the attributes of the data objects and then stores the cluster definitions in cluster definitions storage 140. In some embodiments, clustering engine 125 uses different permutations of the ranges of values of each of the attributes of the data objects to define different clusters.

Figure 2:
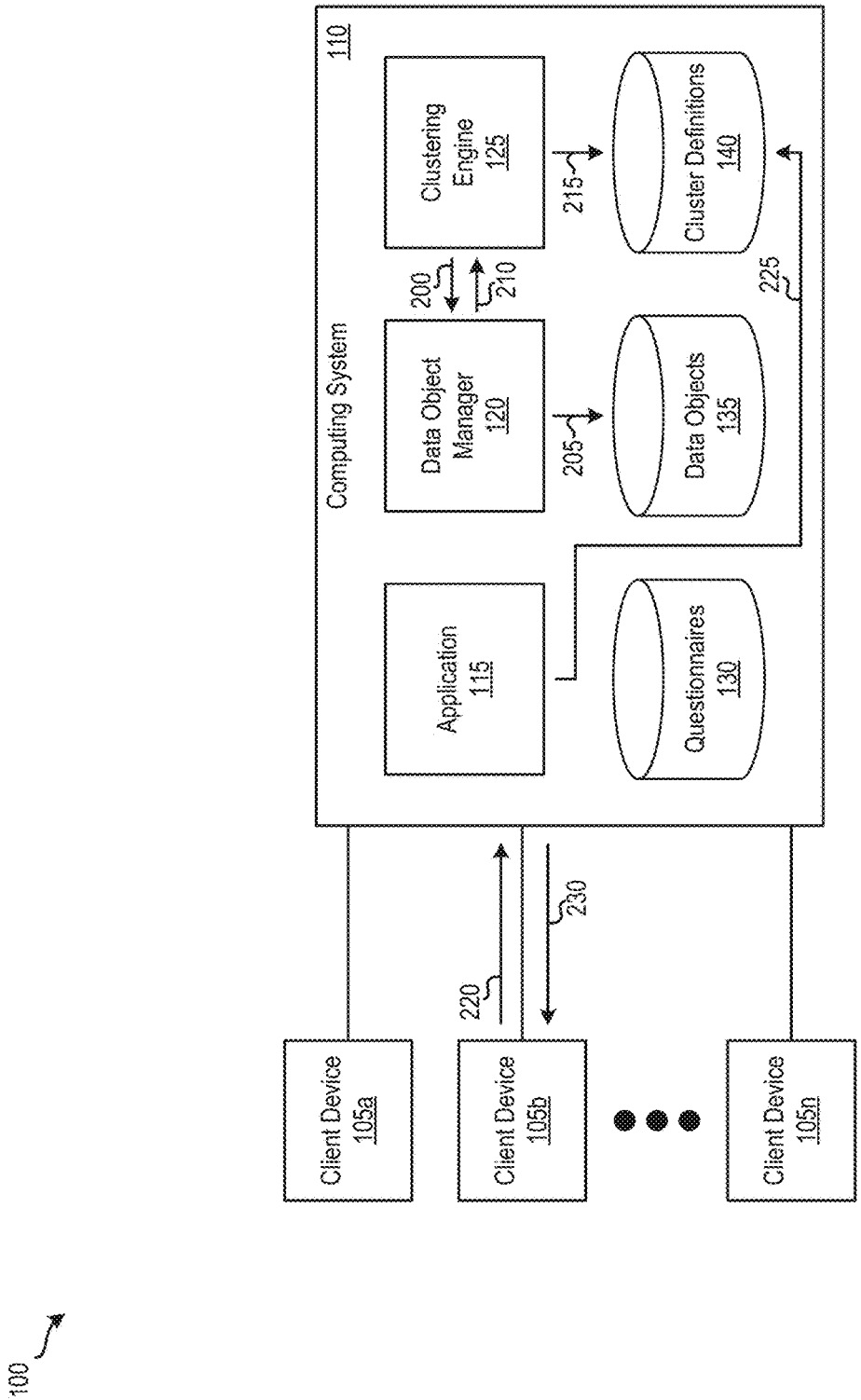
FIG. 2 illustrates an example operation of the system illustrated in FIG. 1 according to some embodiments.

FIG. 2 illustrates an example operation of system 100 according to some embodiments. Specifically, the operation illustrates how computing system 110 defines clusters for a type of data object and how computing system 110 processes a request for the defined clusters. In some embodiments, different types of data objects can be different products that are procurable from sellers. The attributes of a particular type of data object may be attributes associated with the quality of the product. For this example, the type of data objects is red wine. Examples of attributes associated with the quality of red wine may include fixed acidity, volatile acidity, citric acid, residual sugar, chlorides, etc. At the start of the operation, data objects storage 135 includes red wine data objects (e.g., red wine data objects received from one or more client devices 105a-n).

Figures 3, 4, 5:
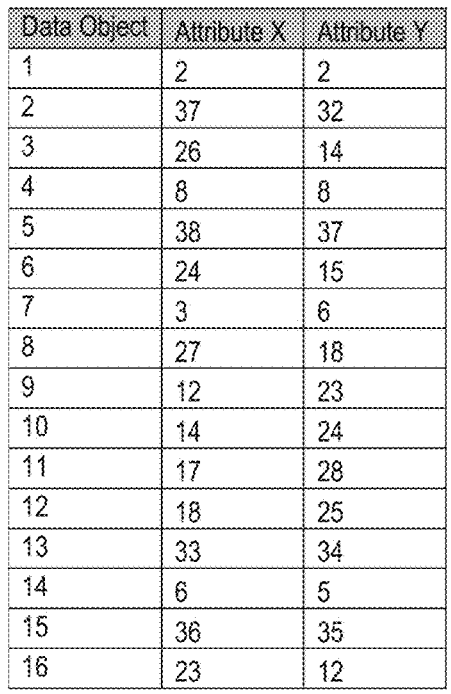
FIG. 3 illustrates example data objects according to some embodiments.
FIG. 4 illustrates sorted attribute values of an attribute of the data objects illustrated in FIG. 3 according to some embodiments.
FIG. 5 illustrates sorted attribute values of another attribute of the data objects illustrated in FIG. 3 according to some embodiments.

FIG. 3 illustrates example data objects 300 according to some embodiments. In particular, data objects 300 are red wine data objects stored in data objects storage 135 in this example. As depicted in FIG. 3, data objects 300 includes sixteen red wine data objects. Each data object includes values for two attributes: an attribute X and an attribute Y. These two attributes represent two qualities associated with red wine.

Returning to FIG. 2, the example operation starts by computing system 110 receiving a request to define clusters for red wine data objects. In response to the request, clustering engine 125 sends, at 200, data object manager 120 a request for red wine data objects. Upon receiving the request, data object manager 120 queries, at 205, data objects storage 135 for red wine data objects. Data object manager 120 identifies data objects 300 and sends, at 210, them to clustering engine 125. Next, clustering engine 125 sorts the values for each attribute of the red wine data objects from smallest to largest. FIG. 4 illustrates sorted attribute values 400 of an attribute of data objects 300 according to some embodiments. Specifically, attribute values 400 are the attribute values for attribute X of data objects 300. As shown, clustering engine 125 sorted the attributed values 400 from smallest to largest. FIG. 5 illustrates sorted attribute values 500 of another attribute of data objects 300 according to some embodiments. In particular, attribute values 500 are the attribute values for attribute Y of data objects 300. As depicted in FIG. 5, clustering engine 125 sorted the attributed values 500 from smallest to largest.

Returning to FIG. 2, clustering engine 125 determines a distance set for each attribute of data objects 300 based on the respective attribute values of the attribute. In some embodiments, a distance set includes the differences between adjacent values in a set of value. For a set of sorted values for an attribute (e.g., sorted attribute values 400, sorted attribute values 500, etc.), the distance set includes the differences between adjacent values in the sorted values. FIG. 6 illustrates the distance set 600 of sorted attribute values 400 according to some embodiments. As shown, distance set 600 includes the differences between adjacent values in sorted attribute values 400. For example, the first value (1.0) in distance set 600 is the difference between the first and second values in sorted attribute values 400 (i.e., the difference between 2.0 and 3.0). The second value (3.0) in distance set 600 is the difference between the second and third values in sorted attribute values 400 (i.e., the difference between 3.0 and 6.0). FIG. 7 illustrates the distance set 700 of sorted attribute values 500 according to some embodiments. As illustrated, distance set 700 includes the differences between adjacent values in sorted attribute values 500. For instance, the first value (3.0) in distance set 700 is the difference between the first and second values in sorted attribute values 500 (i.e., the difference between 2.0 and 5.0). The second value (1.0) in distance set 700 is the difference between the second and third values in sorted attribute values 500 (i.e., the difference between 5.0 and 6.0).

Returning to FIG. 2, after determining distance sets for the attributes of the red wine data objects, clustering engine 125 removes any outliers from each distance set. As mentioned above, in some embodiments, clustering engine 125 determines outliers in a distance set using a Tukey's fences technique. In this example, clustering engine 125 uses a Tukey's fences technique to determine outliers in distance set 600 and distance set 700. Here, clustering engine 125 determines that there are no outliers in distance set 600 or distance set 700. For each attribute of the data objects 300, clustering engine 125 calculates a distance value based on the distance set associated with the attribute. As explained above, clustering engine 125 can calculate a distance value, in some embodiments, by calculating a mean value of the values in the distance set, calculating a standard deviation value based on the values in the distance set, and adding the mean value and the standard deviation value to form the distance value. For this example, clustering engine 125 calculates a distance value for attribute X of data objects 300 by calculating a mean value of distance set 300, calculating a standard deviation value (e.g., a population standard deviation value) based on distance set 300, and adds the mean value and half of the standard deviation value. Here, clustering engine 125 calculates a mean value of distance set 300 as 2.4 and a population standard deviation value of distance set 300 as 1.5405626677722. The sum of the mean value and half of the standard deviation value is 3.1702813338861 (i.e., 2.4+1.5405626677722/2). In addition, clustering engine 125 determines a distance value for attribute Y of data objects 300 using the same method. That is, clustering engine 125 calculates a mean value of distance set 400 as 2.333333333333333 and a population standard deviation value of distance set 300 as 1.2472191289246. The sum of these values is 2.9569428977956 (i.e., 2.333333333333333+1.2472191289246/2).

Once clustering engine 125 calculates distance values for each attribute of data objects 300, clustering engine 125 uses the distance value for each attribute of data objects 300 to determine ranges of values. In this example, clustering engine 125 determines a set of ranges of values for attribute X of data objects 300 by iterating through the sorted attribute values 400 and calculating a difference between adjacent values. The first value in sorted attribute values 400 is used as the first value in a first range of values. When the difference is greater than the calculated distance value, clustering engine 125 uses the smaller value in the adjacent values as the second value in the first range of values. Clustering engine 125 uses the larger value in the adjacent values as the first value in the second range of values. Clustering engine 125 continues this process to define additional ranges of values.

FIG. 8 illustrates ranges of values 800 defined based on attribute values 400 according to some embodiments. As shown, ranges of values 800 includes four ranges of values. Clustering engine 125 defines the first range of values in ranges of values 800 by using the first value in attribute values 400 (2.0) as the first value in the first range of values. Then, clustering engine 125 calculates the difference between the first and second values in attribute values 400 (1.0=3.0−2.0) and determines that the difference is not greater than the distance value determined for attribute X (3.1702813338860896 in this example). Clustering engine 125 then iterates to the second and third values in attribute values 400 and calculates the difference between these values (3.0=6.0−3.0) and determines that the difference is not greater than the distance value determined for attribute X. Clustering engine 125 continues to subsequent adjacent values in attribute values 400 using this process. When clustering engine 125 calculates the difference between the fourth and fifth values in attribute values 400 (4.0=12.0−8.0), clustering engine 125 determines that this difference is greater than the distance value determined for attribute X. As such, clustering engine 125 clustering engine 125 uses the smaller value (8.0) in the adjacent values as the second value in the first range of values. As depicted in FIG. 8, this forms the first range of values in ranges of values 800. Now, clustering engine 125 uses the larger value (12.0) in the adjacent values as the first value in the second range of values, as shown in FIG. 8. Clustering engine 125 continues this process until it finishes iterating through the values in attribute values 400.

FIG. 9 illustrates ranges of values 900 defined based on attribute values 500 according to some embodiments. As illustrated, ranges of values 900 includes seven ranges of values. For this example, clustering engine 125 defines the first range of values in ranges of values 900 by using the first value in attribute values 500 (2.0) as the first value in the first range of values. Next, clustering engine 125 calculates the difference between the first and second values in attribute values 500 (3.0=5.0−2.0) and determines that the difference is greater than the distance value determined for attribute Y (2.956942897795657 in this example). Thus, clustering engine 125 uses the smaller value (2.0) in the adjacent values as the second value in the first range of values. As shown in FIG. 9, this forms the first range of values in ranges of values 900. Clustering engine 125 then uses the larger value (5.0) in the adjacent values as the first value in the second range of values, as depicted in FIG. 9. Clustering engine 125 continues this process until it finishes iterating through the values in attribute values 500.

Figure 10A:
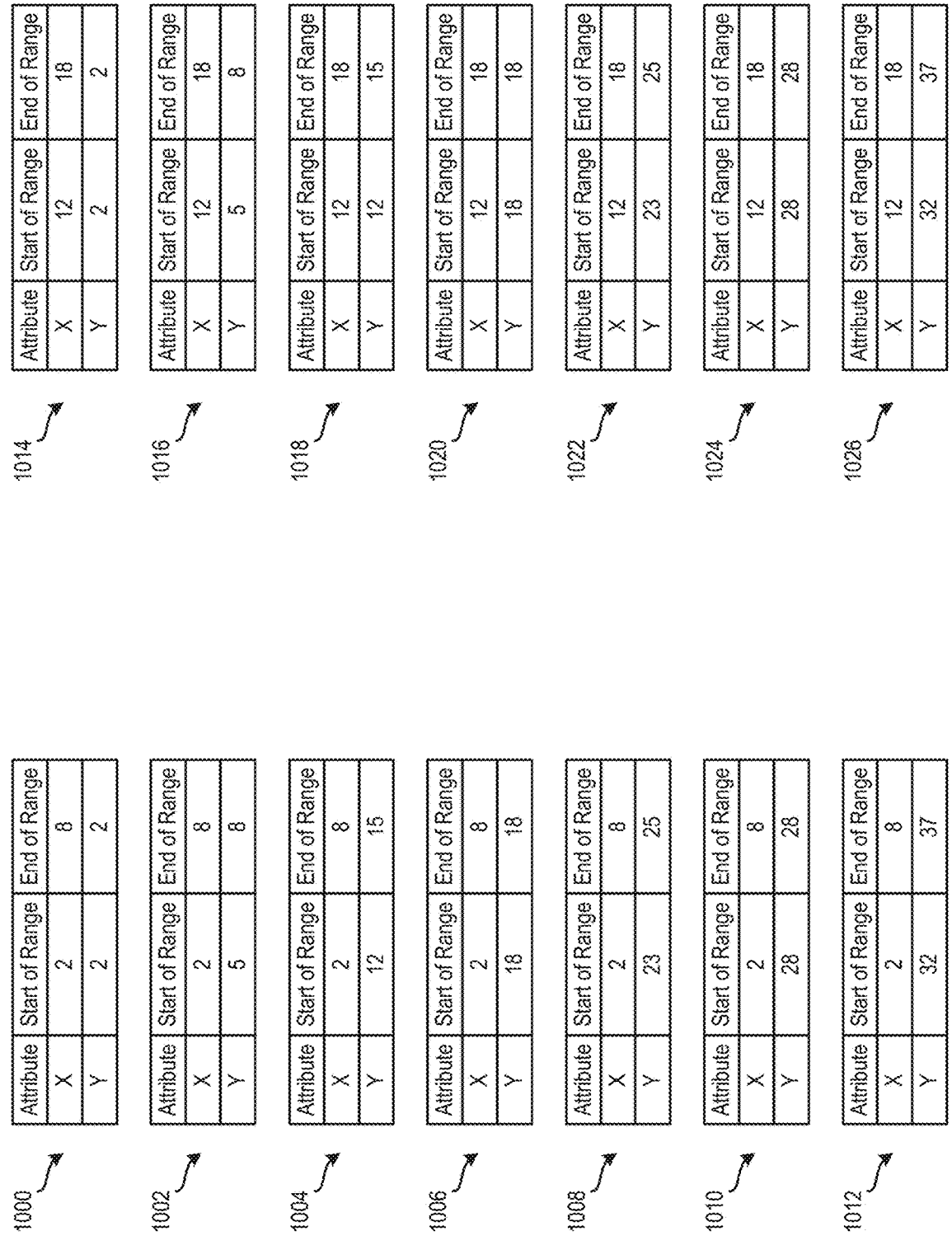

Returning to FIG. 2, clustering engine 125 defines clusters for data objects 300 based on ranges of values 800 and ranges of values 900. For this example, clustering engine 125 uses different permutations of ranges of values 800 and ranges of value 900 to define different clusters. FIGS. 10A and 10B illustrate clusters 1000-1054 defined based on ranges of values 800 and ranges of values 900 according to some embodiments. Specifically, FIG. 10A illustrates clusters 1000-1026 defined based on ranges of values 800 and ranges of values 900. Here, clustering engine 125 defines a cluster as a permutation of a range of values from ranges of values 800 and a range of values from ranges of values 900. Cluster 1000 is defined by the first range of values in range of values 800 and the first range of values in ranges of values 900, cluster 1002 is defined by the first range of values in ranges of values 800 and the second range of values in ranges of values 900, cluster 1004 is defined by the first range of values in ranges of values 800 and the third range of values in ranges of values 900, cluster 1006 is defined by the first range of values in ranges of values 800 and the fourth range of values in ranges of values 900, etc. FIG. 10B illustrates clusters 1028-1054 defined by ranges of values 800 and ranges of values 900. As shown, cluster 1028 is defined by the third range of values in ranges of values 800 and the first range of values in ranges of values 900, cluster 1030 is defined by the third range of values in ranges of values 800 and the second range of values in ranges of values 900, cluster 1032 is defined by the third range of values in ranges of values 800 and the third range of values in ranges of values 900, etc.

Figure 11:
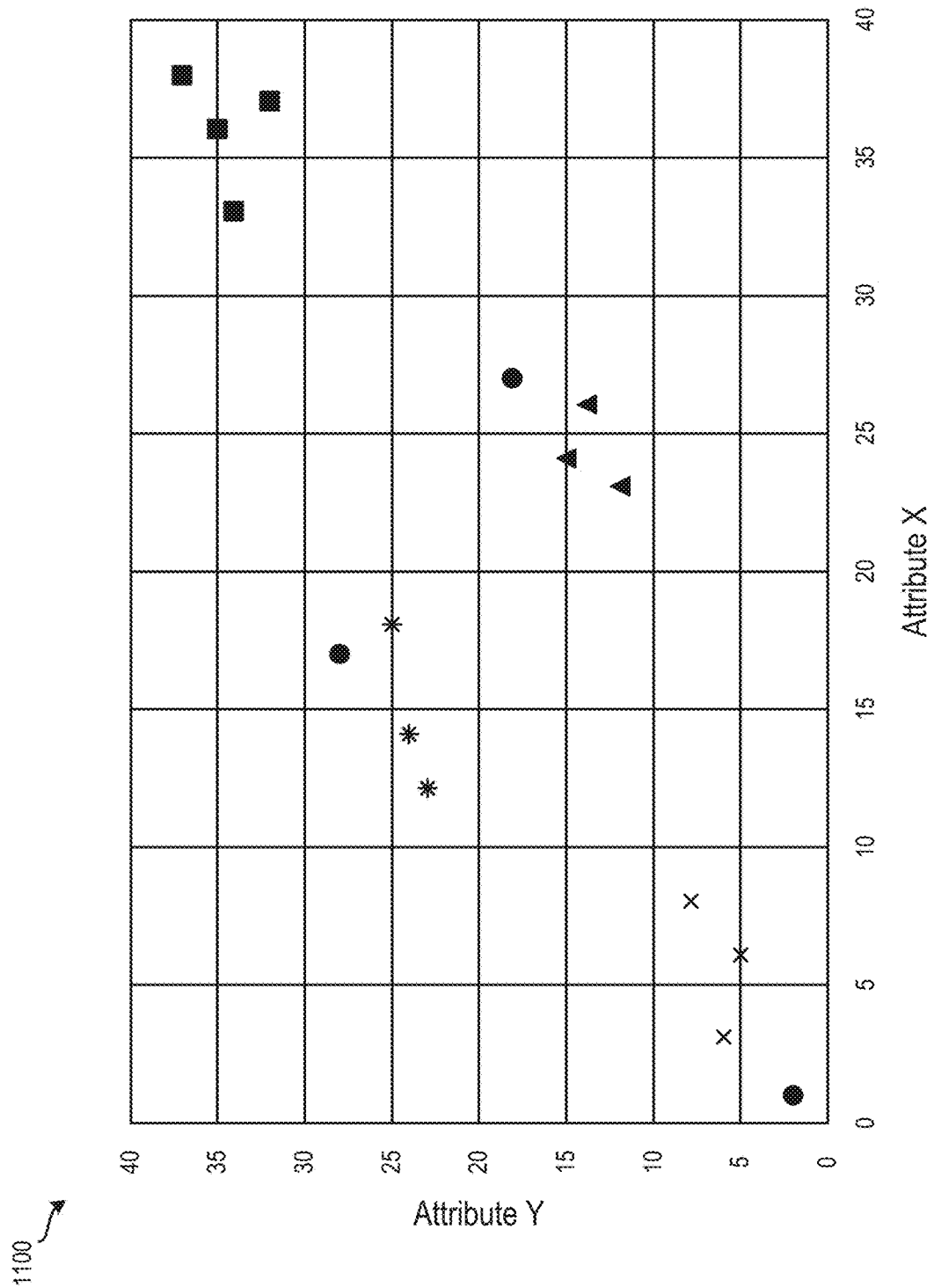
FIG. 11 illustrates a visualization showing the example data objects illustrated in FIG. 3 clustered according to the cluster definitions illustrated in FIGS. 10A and 10B according to some embodiments.

Returning to FIG. 2, once clustering engine 125 defines clusters for data objects 300, clustering engine 125 stores, at 215, them in cluster definitions storage 140. In some instances, cluster definitions defined for a particular type of data objects may be used to group the same type of data objects into clusters. For example, clustering engine 125 may group data objects 300 into clusters using cluster definitions 1000-1054. FIG. 11 illustrates a visualization 1100 showing data objects 300 clustered according to the cluster definitions illustrated in FIGS. 10A and 10B according to some embodiments. Here, each of the data objects in data objects 300 are plotted in visualization 1100 based on its values for attributes X and Y. In this example, clustering engine 135 groups the data objects in data objects 300 represented by an "X" in a first cluster based on cluster definition 1002. Additionally, clustering engine 135 groups the data objects in data objects 300 represented by an asterisk (*) in a second cluster based on cluster definition 1022. Clustering engine 125 also groups the data objects in data objects 300 represented by a triangle in a third cluster based on cluster definition 1032. Finally, clustering engine 125 groups the data objects in data objects 300 represented by a square in a fourth cluster based on cluster definition 1054. Clustering engine 125 does not group data objects that are the only ones that have attribute values that fall within the ranges of a cluster definition. Here, these data objects are represented by circles and, thus, clustering engine 125 does not group them into a cluster.

In this example, at some point after clustering engine 125 has defined cluster definitions 1000-1054, a user of client device 105b sends, at 220, application 115 a request for cluster definitions for red wine data objects. In response to receiving the request, application 115 accesses, at 225, cluster definitions storage 140 and retrieves the requested cluster definitions. Then, application 115 generates a GUI that includes the cluster definitions and provides, at 230, the GUI to client device 105b. FIG. 12 illustrates a GUI 1200 that includes cluster definitions 1000-1054 according to some embodiments. As depicted, GUI 1200 includes the range of values used for defining each of the cluster definitions 1000-1054.

Figure 13:
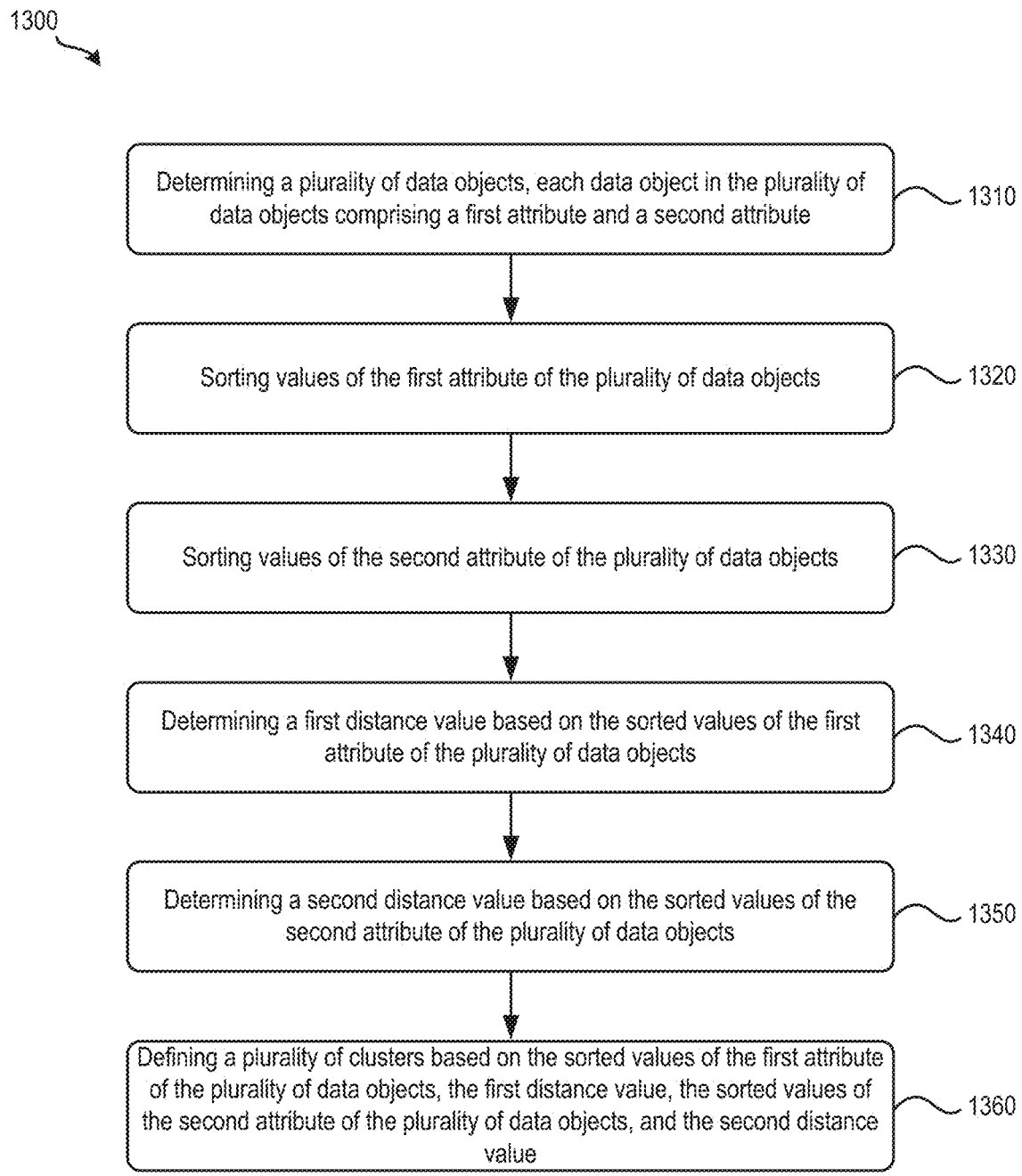
FIG. 13 illustrates a process for defining clusters according to some embodiments.

FIG. 13 illustrates a process 1300 for defining clusters according to some embodiments. In some embodiments, computing system 110 performs process 1300. Process 1300 begins by determining, at 1310, a plurality of data objects. Each data object in the plurality of data objects comprises a first attribute and a second attribute. Referring to FIGS. 2 and 3 as an example, data object manager 120 may determine data objects 300 as the plurality of data objects by retrieving red wine data objects from data objects storage 135 in response to receiving a request from clustering engine 125 for red wine data objects.

Next, process 1300 sorts, at 1320, values of the first attribute of the plurality of data objects. Referring to FIGS. 2-4 as an example, clustering engine 125 sorts values for attribute X in data objects 300 from smallest to largest to form sorted attribute values 400. Process 1300 then sorts, at 1330, values of the second attribute of the plurality of data objects. Referring to FIGS. 2, 3, and 5 as an example, clustering engine 125 sorts values for attribute Y in data objects 300 from smallest to largest to form sorted attribute values 500.

At 1340, process 1300 determines a first distance value based on the sorted values of the first attribute of the plurality of data objects. Referring to FIGS. 2, 4, and 6 as an example, clustering engine 125 can determine the first distance value by determining distance set 600 for attribute X based on sorted attribute values 400, calculating a mean value of the values in the distance set, calculating a standard deviation value based on the values in the distance set, and adding the mean value and the standard deviation value to form the first distance value.

Next, process 1300 determines, at 1350, a second distance value based on the sorted values of the second attribute of the plurality of data objects. Referring to FIGS. 2, 5, and 7 as an example, clustering engine 125 may determine the second distance value by determining distance set 700 for attribute Y based on sorted attribute values 500, calculating a mean value of the values in the distance set, calculating a standard deviation value based on the values in the distance set, and adding the mean value and the standard deviation value to form the second distance value.

Finally, process 1300 defines, at 1360, a plurality of clusters based on the sorted values of the first attribute of the plurality of data objects, the first distance value, the sorted values of the second attribute of the plurality of data objects, and the second distance value. Referring to FIGS. 2 and 4-10 as an example, clustering engine 125 defines the plurality of clusters by defining ranges of values 800 based on the distance value determined for attribute X and sorted attribute values 400, defining ranges of values 900 based on the distance value determined for attribute Y and sorted attribute values 500, and uses different permutations of ranges of values 800 and ranges of value 900 to define different clusters, as illustrated in FIGS. 10A and 10B.

The examples and embodiments described above by reference to FIGS. 1-13 show a type of data object that has two attributes. One of ordinary of skill in the art will understand that the techniques and methods employed in the examples and embodiments can be applied to types of data objects that have any number of attributes. Moreover, the attributes can include attributes other than those used to indicate the quality of a product.

Figure 14:
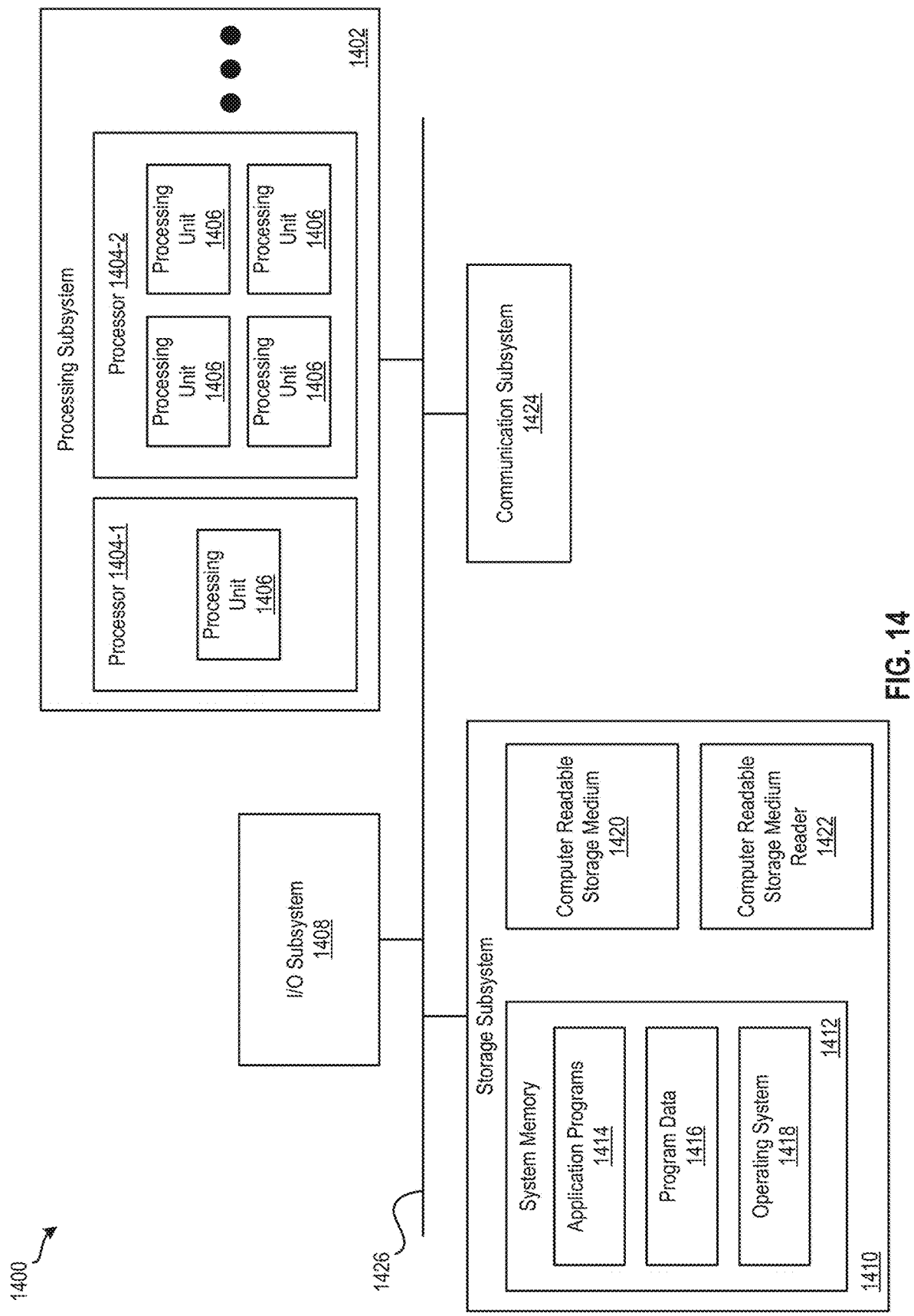
FIG. 14 illustrates an exemplary computer system, in which various embodiments may be implemented.

FIG. 14 illustrates an exemplary computer system 1400 for implementing various embodiments described above. For example, computer system 1400 may be used to implement client devices 105*a-n* and computing system 110. Computer system 1400 may be a desktop computer, a laptop, a server computer, or any other type of computer system or combination thereof. Some or all elements of application 115, data object manager 120, clustering engine 125, or combinations thereof can be included or implemented in computer system 1400. In addition, computer system 1400 can implement many of the operations, methods, and/or processes described above (e.g., process 1300). As shown in FIG. 14, computer system 1400 includes processing subsystem 1402, which communicates, via bus subsystem 1426, with input/output (I/O) subsystem 1408, storage subsystem 1410 and communication subsystem 1424.

Bus subsystem 1426 is configured to facilitate communication among the various components and subsystems of computer system 1400. While bus subsystem 1426 is illustrated in FIG. 14 as a single bus, one of ordinary skill in the art will understand that bus subsystem 1426 may be implemented as multiple buses. Bus subsystem 1426 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1402, which can be implemented as one or more integrated circuits (e.g., a conventional microprocessor or microcontroller), controls the operation of computer system 1400. Processing subsystem 1402 may include one or more processors 1404. Each processor 1404 may include one processing unit 1406 (e.g., a single core processor such as processor 1404-1) or several processing units 1406 (e.g., a multicore processor such as processor 1404-2). In some embodiments, processors 1404 of processing subsystem 1402 may be implemented as independent processors while, in other embodiments, processors 1404 of processing subsystem 1402 may be implemented as multiple processors integrate into a single chip or multiple chips. Still, in some embodiments, processors 1404 of processing subsystem 1402 may be implemented as a combination of independent processors and multiple processors integrated into a single chip or multiple chips.

In some embodiments, processing subsystem 1402 can execute a variety of programs or processes in response to program code and can maintain multiple concurrently executing programs or processes. At any given time, some or all of the program code to be executed can reside in processing subsystem 1402 and/or in storage subsystem 1410. Through suitable programming, processing subsystem 1402 can provide various functionalities, such as the functionalities described above by reference to process 1300, etc.

I/O subsystem 1408 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1400 to a user or another device (e.g., a printer).

As illustrated in FIG. 14, storage subsystem 1410 includes system memory 1412, computer-readable storage medium 1420, and computer-readable storage medium reader 1422. System memory 1412 may be configured to store software in the form of program instructions that are loadable and executable by processing subsystem 1402 as well as data generated during the execution of program instructions. In some embodiments, system memory 1412 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1412 may include different types of memory, such as static random access memory (SRAM) and/or dynamic random access memory (DRAM). System memory 1412 may include a basic input/output system (BIOS), in some embodiments, that is configured to store basic routines to facilitate transferring information between elements within computer system 1400 (e.g., during start-up). Such a BIOS may be stored in ROM (e.g., a ROM chip), flash memory, or any other type of memory that may be configured to store the BIOS.

As shown in FIG. 14, system memory 1412 includes application programs 1414 (e.g., application 115), program data 1416, and operating system (OS) 1418. OS 1418 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1420 may be a non-transitory computer-readable medium configured to store software (e.g., programs, code modules, data constructs, instructions, etc.). Many of the components (e.g., application 115, data object manager 120, and clustering engine 125) and/or processes (e.g., process 1300) described above may be implemented as software that when executed by a processor or processing unit (e.g., a processor or processing unit of processing subsystem 1402) performs the operations of such components and/or processes. Storage subsystem 1410 may also store data used for, or generated during, the execution of the software.

Storage subsystem 1410 may also include computer-readable storage medium reader 1422 that is configured to communicate with computer-readable storage medium 1420. Together and, optionally, in combination with system memory 1412, computer-readable storage medium 1420 may comprehensively represent remote, local, fixed, and/or removable storage devices plus storage media for temporarily and/or more permanently containing, storing, transmitting, and retrieving computer-readable information.

Computer-readable storage medium 1420 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1424 serves as an interface for receiving data from, and transmitting data to, other devices, computer systems, and networks. For example, communication subsystem 1424 may allow computer system 1400 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1424 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1424 may provide components configured for wired communication (e.g., Ethernet) in addition to or instead of components configured for wireless communication.

One of ordinary skill in the art will realize that the architecture shown in FIG. 14 is only an example architecture of computer system 1400, and that computer system 1400 may have additional or fewer components than shown, or a different configuration of components. The various components shown in FIG. 14 may be implemented in hardware, software, firmware or any combination thereof, including one or more signal processing and/or application specific integrated circuits.

Figure 15:
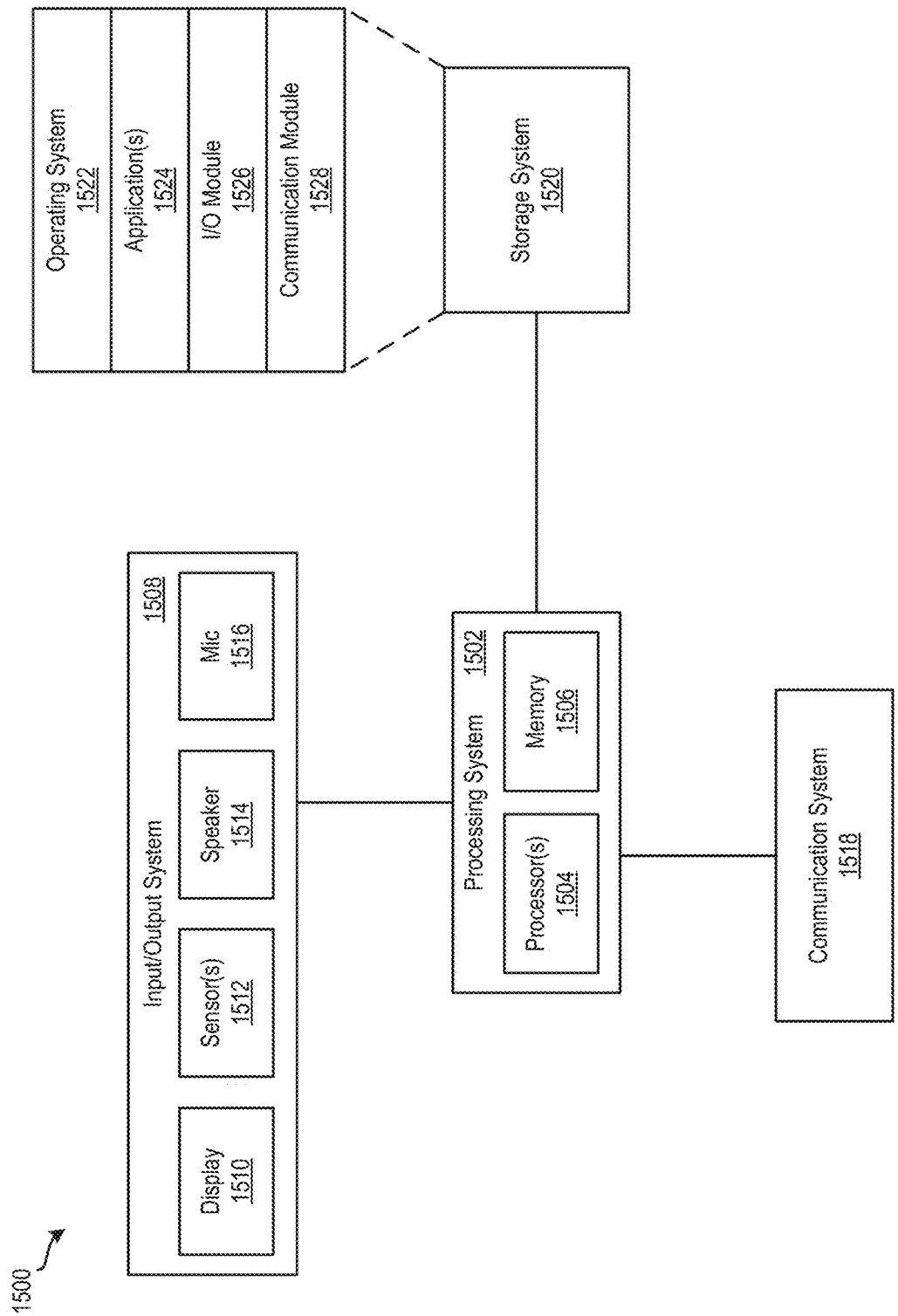
FIG. 15 illustrates an exemplary computing device, in which various embodiments may be implemented.

FIG. 15 illustrates an exemplary computing device 1500 for implementing various embodiments described above. For example, computing device 1500 may be used to implement client devices 105a-n. Computing device 1500 may be a cellphone, a smartphone, a wearable device, an activity tracker or manager, a tablet, a personal digital assistant (PDA), a media player, or any other type of mobile computing device or combination thereof. As shown in FIG. 15, computing device 1500 includes processing system 1502, input/output (I/O) system 1508, communication system 1518, and storage system 1520. These components may be coupled by one or more communication buses or signal lines.

Processing system 1502, which can be implemented as one or more integrated circuits (e.g., a conventional microprocessor or microcontroller), controls the operation of computing device 1500. As shown, processing system 1502 includes one or more processors 1504 and memory 1506. Processors 1504 are configured to run or execute various software and/or sets of instructions stored in memory 1506 to perform various functions for computing device 1500 and to process data.

Each processor of processors 1504 may include one processing unit (e.g., a single core processor) or several processing units (e.g., a multicore processor). In some embodiments, processors 1504 of processing system 1502 may be implemented as independent processors while, in other embodiments, processors 1504 of processing system 1502 may be implemented as multiple processors integrate into a single chip. Still, in some embodiments, processors 1504 of processing system 1502 may be implemented as a combination of independent processors and multiple processors integrated into a single chip.

Memory 1506 may be configured to receive and store software (e.g., operating system 1522, applications 1524, I/O module 1526, communication module 1528, etc. from storage system 1520) in the form of program instructions that are loadable and executable by processors 1504 as well as data generated during the execution of program instructions. In some embodiments, memory 1506 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1508 is responsible for receiving input through various components and providing output through various components. As shown for this example, I/O system 1508 includes display 1510, one or more sensors 1512, speaker 1514, and microphone 1516. Display 1510 is configured to output visual information (e.g., a graphical user interface (GUI) generated and/or rendered by processors 1504). In some embodiments, display 1510 is a touch screen that is configured to also receive touch-based input. Display 1510 may be implemented using liquid crystal display (LCD) technology, light-emitting diode (LED) technology, organic LED (OLED) technology, organic electro luminescence (OEL) technology, or any other type of display technologies. Sensors 1512 may include any number of different types of sensors for measuring a physical quantity (e.g., temperature, force, pressure, acceleration, orientation, light, radiation, etc.). Speaker 1514 is configured to output audio information and microphone 1516 is configured to receive audio input. One of ordinary skill in the art will appreciate that I/O system 1508 may include any number of additional, fewer, and/or different components. For instance, I/O system 1508 may include a keypad or keyboard for receiving input, a port for transmitting data, receiving data and/or power, and/or communicating with another device or component, an image capture component for capturing photos and/or videos, etc.

Communication system 1518 serves as an interface for receiving data from, and transmitting data to, other devices, computer systems, and networks. For example, communication system 1518 may allow computing device 1500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1518 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1518 may provide components configured for wired communication (e.g., Ethernet) in addition to or instead of components configured for wireless communication.

Storage system 1520 handles the storage and management of data for computing device 1500. Storage system 1520 may be implemented by one or more non-transitory machine-readable mediums that are configured to store software (e.g., programs, code modules, data constructs, instructions, etc.) and store data used for, or generated during, the execution of the software.

In this example, storage system 1520 includes operating system 1522, one or more applications 1524, I/O module 1526, and communication module 1528. Operating system 1522 includes various procedures, sets of instructions, software components and/or drivers for controlling and managing general system tasks (e.g., memory management, storage device control, power management, etc.) and facilitates communication between various hardware and software components. Operating system 1522 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1524 can include any number of different applications installed on computing device 1500. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1526 manages information received via input components (e.g., display 1510, sensors 1512, and microphone 1516) and information to be outputted via output components (e.g., display 1510 and speaker 1514). Communication module 1528 facilitates communication with other devices via communication system 1518 and includes various software components for handling data received from communication system 1518.

One of ordinary skill in the art will realize that the architecture shown in FIG. 15 is only an example architecture of computing device 1500, and that computing device 1500 may have additional or fewer components than shown, or a different configuration of components. The various components shown in FIG. 15 may be implemented in hardware, software, firmware or any combination thereof, including one or more signal processing and/or application specific integrated circuits.

Figure 16:
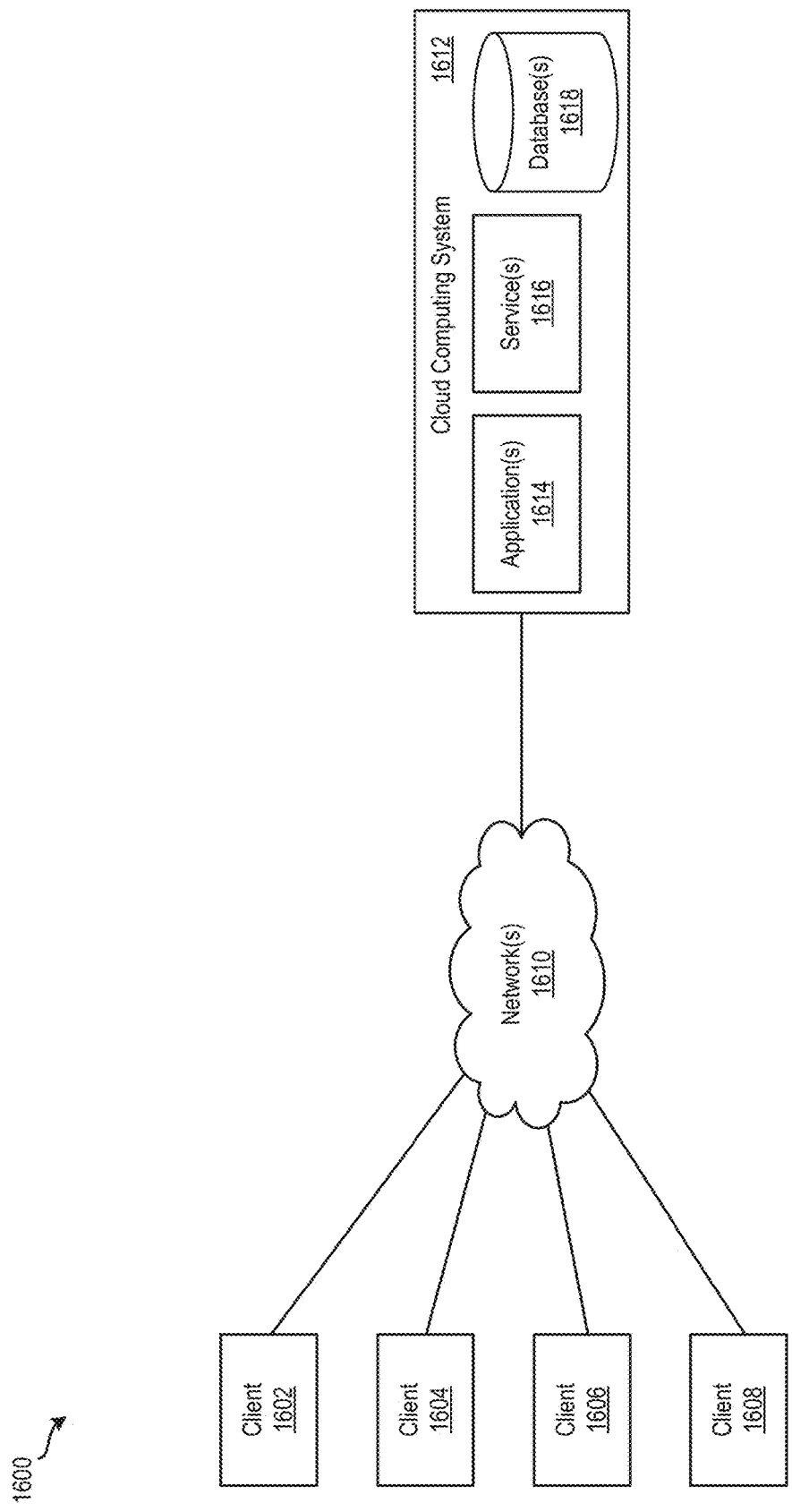
FIG. 16 illustrates an exemplary system, in which various embodiments may be implemented.

FIG. 16 illustrates an exemplary system 1600 for implementing various embodiments described above. For example, client devices 1602-1608 may be used to implement client devices 105*a-n* and cloud computing system 1612 may be used to implement computing system 110. As shown, system 1600 includes client devices 1602-1608, one or more networks 1610, and cloud computing system 1612. Cloud computing system 1612 is configured to provide resources and data to client devices 1602-1608 via networks 1610. In some embodiments, cloud computing system 1600 provides resources to any number of different users (e.g., customers, tenants, organizations, etc.). Cloud computing system 1612 may be implemented by one or more computer systems (e.g., servers), virtual machines operating on a computer system, or a combination thereof.

As shown, cloud computing system 1612 includes one or more applications 1614, one or more services 1616, and one or more databases 1618. Cloud computing system 1600 may provide applications 1614, services 1616, and databases 1618 to any number of different customers in a self-service, subscription-based, elastically scalable, reliable, highly available, and secure manner.

In some embodiments, cloud computing system 1600 may be adapted to automatically provision, manage, and track a customer's subscriptions to services offered by cloud computing system 1600. Cloud computing system 1600 may provide cloud services via different deployment models. For example, cloud services may be provided under a public cloud model in which cloud computing system 1600 is owned by an organization selling cloud services and the cloud services are made available to the general public or different industry enterprises. As another example, cloud services may be provided under a private cloud model in which cloud computing system 1600 is operated solely for a single organization and may provide cloud services for one or more entities within the organization. The cloud services may also be provided under a community cloud model in which cloud computing system 1600 and the cloud services provided by cloud computing system 1600 are shared by several organizations in a related community. The cloud services may also be provided under a hybrid cloud model, which is a combination of two or more of the aforementioned different models.

In some instances, any one of applications 1614, services 1616, and databases 1618 made available to client devices 1602-1608 via networks 1610 from cloud computing system 1612 is referred to as a "cloud service." Typically, servers and systems that make up cloud computing system 1612 are different from the on-premises servers and systems of a customer. For example, cloud computing system 1612 may host an application and a user of one of client devices 1602-1608 may order and use the application via networks 1610.

Applications 1614 may include software applications that are configured to execute on cloud computing system 1612 (e.g., a computer system or a virtual machine operating on a computer system) and be accessed, controlled, managed, etc. via client devices 1602-1608. In some embodiments, applications 1614 may include server applications and/or mid-tier applications (e.g., HTTP (hypertext transport protocol) server applications, FTP (file transfer protocol) server applications, CGI (common gateway interface) server applications, JAVA server applications, etc.). Services 1616 are software components, modules, application, etc. that are configured to execute on cloud computing system 1612 and provide functionalities to client devices 1602-1608 via networks 1610. Services 1616 may be web-based services or on-demand cloud services.

Databases 1618 are configured to store and/or manage data that is accessed by applications 1614, services 1616, and/or client devices 1602-1608. For instance, storages 130-140 may be stored in databases 1618. Databases 1618 may reside on a non-transitory storage medium local to (and/or resident in) cloud computing system 1612, in a storage-area network (SAN), on a non-transitory storage medium local located remotely from cloud computing system 1612. In some embodiments, databases 1618 may include relational databases that are managed by a relational database management system (RDBMS). Databases 1618 may be a column-oriented databases, row-oriented databases, or a combination thereof. In some embodiments, some or all of databases 1618 are in-memory databases. That is, in some such embodiments, data for databases 1618 are stored and managed in memory (e.g., random access memory (RAM)).

Client devices 1602-1608 are configured to execute and operate a client application (e.g., a web browser, a proprietary client application, etc.) that communicates with applications 1614, services 1616, and/or databases 1618 via networks 1610. This way, client devices 1602-1608 may access the various functionalities provided by applications 1614, services 1616, and databases 1618 while applications 1614, services 1616, and databases 1618 are operating (e.g., hosted) on cloud computing system 1600. Client devices 1602-1608 may be computer system 1400 or computing device 1500, as described above by reference to FIGS. 14 and 15, respectively. Although system 1600 is shown with four client devices, any number of client devices may be supported.

Networks 1610 may be any type of network configured to facilitate data communications among client devices 1602-1608 and cloud computing system 1612 using any of a variety of network protocols. Networks 1610 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
    determining a plurality of data objects, each data object in the plurality of data objects comprising a first attribute and a second attribute;
    sorting values of the first attribute of the plurality of data objects from smallest to largest;
    removing outliers from the sorted values of the first attribute of the plurality of data objects;
    sorting values of the second attribute of the plurality of data objects from smallest to largest;
    removing outliers from the sorted values of the second attribute of the plurality of data objects;
    determining a first distance value based on the sorted values of the first attribute of the plurality of data objects;
    determining a second distance value based on the sorted values of the second attribute of the plurality of data objects; and
    defining a plurality of clusters based on the sorted values of the first attribute of the plurality of data objects, the first distance value, the sorted values of the second attribute of the plurality of data objects, and the second distance value.

2. The non-transitory machine-readable medium of claim 1, wherein defining the plurality of clusters comprises:
    defining a first set of ranges of values based on the first plurality of values and the first distance value;
    defining a second set of ranges of values based on the second plurality of values and the second distance value; and
    determining a set of permutations of a range of values in the first set of ranges of values and a range of values in the second set of ranges of values, wherein each cluster in the plurality of clusters is defined based on a permutation in the set of permutations of a range of values in the first set of ranges of values and a range of values in the second set of ranges of values.

3. The non-transitory machine-readable medium of claim 2, wherein the program further comprises a set of instructions for providing, for each cluster in the plurality of clusters, the range of values of the first attribute used to define the cluster and the range of values of the second attribute used to define the cluster.

4. The non-transitory machine-readable medium of claim 1, wherein the program further comprises a set of instructions for assigning data objects in the plurality of clusters based on the values of the first and second attributes of the data objects.

5. The non-transitory machine-readable medium of claim 1, wherein the program further comprises sets of instructions for:
    receiving, from each source in a plurality of sources, a set of answers to a set of questions in a questionnaire regarding a data object; and
    determining the values of the first attribute and the second attribute of the plurality of data objects based on the set of answers received from the plurality of sources.

6. The non-transitory machine-readable medium of claim 5, wherein determining the values of the first attribute and the second attribute of the plurality of data objects comprises translating the set of answers from each source in the plurality of sources to a set of numerical values.

7. The non-transitory machine-readable medium of claim 1, wherein the program further comprises a set of instructions for providing a visualization showing the data objects assigned to clusters.

8. A method comprising:
   determining a plurality of data objects, each data object in the plurality of data objects comprising a first attribute and a second attribute;
   sorting values of the first attribute of the plurality of data objects from smallest to largest;
   removing outliers from the sorted values of the first attribute of the plurality of data objects;
   sorting values of the second attribute of the plurality of data objects from smallest to largest;
   removing outliers from the sorted values of the second attribute of the plurality of data objects;
   determining a first distance value based on the sorted values of the first attribute of the plurality of data objects;
   determining a second distance value based on the sorted values of the second attribute of the plurality of data objects; and
   defining a plurality of clusters based on the sorted values of the first attribute of the plurality of data objects, the first distance value, the sorted values of the second attribute of the plurality of data objects, and the second distance value.

9. The method of claim 8, wherein defining the plurality of clusters comprises:
   defining a first set of ranges of values based on the first plurality of values and the first distance value;
   defining a second set of ranges of values based on the second plurality of values and the second distance value; and
   determining a set of permutations of a range of values in the first set of ranges of values and a range of values in the second set of ranges of values, wherein each cluster in the plurality of clusters is defined based on a permutation in the set of permutations of a range of values in the first set of ranges of values and a range of values in the second set of ranges of values.

10. The method of claim 9 further comprising presenting, for each cluster in the plurality of clusters, the range of values of the first attribute used to define the cluster and the range of values of the second attribute used to define the cluster.

11. The method of claim 8 further comprising assigning data objects in the plurality of clusters based on the values of the first and second attributes of the data objects.

12. The method of claim 8 further comprising:
   receiving, from each source in a plurality of sources, a set of answers to a set of questions in a questionnaire regarding a data object; and
   determining the values of the first attribute and the second attribute of the plurality of data objects based on the set of answers received from the plurality of sources.

13. The method of claim 12, wherein determining the values of the first attribute and the second attribute of the plurality of data objects comprises translating the set of answers from each source in the plurality of sources to a set of numerical values.

14. The method of claim 8 further comprising providing a visualization showing the data objects assigned to clusters.

15. A system comprising:
   a set of processing units; and
   a non-transitory machine-readable medium storing instructions that when executed by at least one processing unit in the set of processing units cause the at least one processing unit to:
   determine a plurality of data objects, each data object in the plurality of data objects comprising a first attribute and a second attribute;
   sort values of the first attribute of the plurality of data objects from smallest to largest;
   remove outliers from the sorted values of the first attribute of the plurality of data objects;
   sort values of the second attribute of the plurality of data objects from smallest to largest;
   remove outliers from the sorted values of the second attribute of the plurality of data objects;
   determine a first distance value based on the sorted values of the first attribute of the plurality of data objects;
   determine a second distance value based on the sorted values of the second attribute of the plurality of data objects; and
   define a plurality of clusters based on the sorted values of the first attribute of the plurality of data objects, the first distance value, the sorted values of the second attribute of the plurality of data objects, and the second distance value.

16. The system of claim 15, wherein defining the plurality of clusters comprises:
   defining a first set of ranges of values based on the first plurality of values and the first distance value;
   defining a second set of ranges of values based on the second plurality of values and the second distance value; and
   determining a set of permutations of a range of values in the first set of ranges of values and a range of values in the second set of ranges of values, wherein each cluster in the plurality of clusters is defined based on a permutation in the set of permutations of a range of values in the first set of ranges of values and a range of values in the second set of ranges of values.

17. The system of claim 15, wherein the instructions further cause the at least one processing unit to assign data objects in the plurality of clusters based on the values of the first and second attributes of the data objects.

18. The system of claim 15, wherein the instructions further cause the at least one processing unit to:
   receive, from each source in a plurality of sources, a set of answers to a set of questions in a questionnaire regarding a data object; and
   determine the values of the first attribute and the second attribute of the plurality of data objects based on the set of answers received from the plurality of sources.

19. The system of claim 18, wherein determining the values of the first attribute and the second attribute of the plurality of data objects comprises translating the set of answers from each source in the plurality of sources to a set of numerical values.

20. The system of claim 15, wherein the instructions further cause the at least one processing unit to provide a visualization showing the data objects assigned to clusters.

* * * * *